United States Patent [19]

Sawada

[11] Patent Number: 5,965,196
[45] Date of Patent: *Oct. 12, 1999

[54] METHOD FOR CONTROLLING TRANSPARENCY OF PRINT

[75] Inventor: Hidemasa Sawada, Gifu, Japan

[73] Assignee: Brother Kogyo Kabushiki Kaisha, Nagoya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,186

[22] Filed: Jun. 11, 1997

[30] Foreign Application Priority Data

Jun. 14, 1996 [JP] Japan .................................. 8-153602
Jun. 14, 1996 [JP] Japan .................................. 8-153603

[51] Int. Cl.$^6$ .............................. B05D 1/02; B41J 2/01; C08L 91/06
[52] U.S. Cl. ........................ 427/161; 427/288; 427/384; 427/385.5; 427/422; 523/160; 523/161; 524/491
[58] Field of Search .................... 523/160, 161; 524/275, 277, 278, 279, 478, 479, 480, 487, 488, 489, 490; 106/31.29, 31.3, 31.31, 31.61, 31.62, 31.63; 427/161, 384, 385.5, 422, 288

[56] References Cited

U.S. PATENT DOCUMENTS

| | | | |
|---|---|---|---|
| 4,684,956 | 8/1987 | Ball | 106/31.3 |
| 4,851,045 | 7/1989 | Taniguchi | 524/277 |
| 5,053,079 | 10/1991 | Haxell et al. | 106/31.63 |
| 5,259,873 | 11/1993 | Fujioka | 524/488 |
| 5,259,874 | 11/1993 | Miller et al. | 106/31.61 |
| 5,354,368 | 10/1994 | Larson, Jr. | 106/31.3 |
| 5,397,388 | 3/1995 | Fujioka | 106/31.29 |
| 5,409,530 | 4/1995 | Kanbayashi et al. | 106/31.29 |
| 5,531,819 | 7/1996 | Sawada | 524/114 |
| 5,560,765 | 10/1996 | Sawada | 524/232 |
| 5,574,078 | 11/1996 | Elwakil | 524/277 |
| 5,624,483 | 4/1997 | Fujioka | 106/31.3 |
| 5,669,965 | 9/1997 | Sawada et al. | 524/487 |

FOREIGN PATENT DOCUMENTS

| | | |
|---|---|---|
| 0 565 735 A1 | 10/1993 | European Pat. Off. . |
| 0 709 439 A1 | 5/1996 | European Pat. Off. . |
| 0 739 958 A2 | 10/1996 | European Pat. Off. . |

*Primary Examiner*—Peter A. Szekely
*Attorney, Agent, or Firm*—Oliff & Berridge, PLC

[57] ABSTRACT

A hot-melt ink composition, which is solid at room temperature, comprises a wax having a melting point of about 50° C. or above, a resin and a colorant. The resin has a softening point higher than the melting point of the wax in order to obtain a transparent image, or the resin has a softening point lower than the melting point of the wax in order to obtain an opaque image.

34 Claims, 1 Drawing Sheet

FIG. 1

METHOD FOR CONTROLLING TRANSPARENCY OF PRINT

BACKGROUND OF THE INVENTION

1. Field of the Invention

This invention relates to a hot-melt ink composition used in ink-jet recording apparatus. More particularly, it relates to a hot-melt ink composition capable of forming transparent images and to a hot-melt ink composition capable of forming opaque images.

2. Description of the Related Art

As ink-jet recording systems, various systems are proposed, e.g., what is called an electric field control system, in which electrostatic attraction is utilized to eject ink; what is called a drop on-demand system (or pressure pulse system), in which vibratory pressure of a piezoelectric device is utilized to eject ink; and what is called a thermal ink-jet system, in which a pressure produced by bubbles formed and grown by high heat is utilized to eject ink. These systems can provide very highly precise printed images.

In these ink-jet recording systems, water-based inks employing water as a main solvent and oil-based inks employing an organic solvent as a main solvent are commonly used. Printed images obtained using the water-based inks have a poor water resistance in general. On the other hand, the use of oil-based inks can provide printed images having a good water resistance.

However, these water-based inks and oil-based inks are liquid at room temperature, and hence have had disadvantages that feathering tends to occur when images are printed on recording paper and that no sufficient print density can be obtained. Also, because the inks are liquid, they tend to cause formation of deposits to cause a great lowering of the reliability of ink-jet recording systems because of, e.g., clogging of nozzles.

In order to overcome such disadvantages of the conventional inks of a solution type, what is called hot-melt oil-based ink-jet recording ink compositions, which are solid at room temperature and melt upon heating, are proposed.

Stated specifically, U.S. Pat. No. 3,653,932 discloses an ink containing a dialkyl sebacate. U.S. Pat. No. 4,390,369 and Japanese Patent Application Laid-open No. 58-108271 disclose an ink containing a natural wax. Japanese Patent Application Laid-open No. 59-22973 discloses an ink containing a stearic acid. Japanese Patent Application Laid-open No. 61-83268 discloses an ink containing an acid or alcohol having 20 to 24 carbon atoms and a ketone having a relatively higher melting point than these. Japanese Patent Application Laid-open No. 62-48774 discloses an ink containing a thermosetting resin having a high hydroxyl value, a solid organic solvent having a melting point lower than 150° C. and a small quantity of a dye substance. Japanese Patent Application Laid-open No. 62-112627 discloses an ink comprised of a colorant, a first solvent which is solid at room temperature and is capable of liquefying upon heating to a temperature higher than the room temperature and a second solvent capable of dissolving the first solvent, being liquid at room temperature and being highly volatile. Also, Japanese Patent Application Laid-open No. 62-295973 discloses an ink containing a synthetic wax having a polar group and a dye soluble in the wax.

However, these hot-melt ink compositions have been developed without taking account of any relationship between the softening point of resin and the melting point of wax when the the resin and the wax are mixed.

Accordingly, under existing circumstances, any hot-melt ink composition suited for hot-melt ink-jet recording, having a good transparency on printing paper and OHP (overhead projection) sheets while satisfying both the basic performance required as ink and a good print quality, have not been produced while taking account of the relationship between the softening point of resin and the melting point of wax.

Meanwhile, when hot-melt ink compositions are made to adhere to OHP sheets and light is transmitted therethrough to project images onto screens, it is necessary to use an opaque hot-melt ink composition in order to surely form shadowed areas (black areas) on the projection screen. Similarly, when full-color projection images are formed, it is also necessary to use opaque hot-melt ink compositions so that areas printed in chromatic colors such as red, yellow and so forth on the OHP sheet can transmit light to form the corresponding chromatic areas on the projection screen, and at the same time the areas printed in black on the OHP sheet can surely form shadowed areas on the projection screen.

In conventional instances where such opaque hot-melt ink compositions are prepared, it has been attempted to incorporate a black dye in ink to the maximum of its solubility. However, the resulting ink composition can not be completely opaque, and it has been difficult to form black-and-white images on the projection screen.

Thus, under existing circumstances, any opaque hot-melt ink composition suited for hot-melt ink-jet recording, having a sufficient density on printing paper and OHP sheets while satisfying both the basic performance required as ink and a good print quality, have not been produced while taking account of the relationship between the softening point of resin and the melting point of wax.

SUMMARY OF THE INVENTION

The present invention was made in order to solve the above problems involved in the prior art.

Accordingly, a first object of the present invention is to provide a hot-melt ink composition suited for hot-melt ink-jet recording, being capable of forming highly transparent images on printing paper and OHP sheets while satisfying both the basic performance required as ink and a good print quality, the ink composition being produced while taking account of the relationship between the softening point of resin and the melting point of wax.

A second object of the present invention is to provide a hot-melt ink composition suited for hot-melt ink-jet recording, being capable of forming opaque images having a sufficient density on printing paper and OHP sheets while satisfying both the basic performance required as ink and a good print quality, the ink composition being produced while taking account of the relationship between the softening point of resin and the melting point of wax.

To achieve the first object, as a first embodiment of the present invention, it provides a hot-melt ink composition which is solid at room temperature and is capable of forming a transparent image, comprising a wax having a melting point of about 50° C. or above, a resin and a colorant, said resin having a softening point higher than the melting point of the wax.

To achieve the second object, as a second embodiment of the present invention, it provides a hot-melt ink composition which is solid at room temperature and is capable of forming an opaque image, comprising a wax having a melting point of about 50° C. or above, a resin and a colorant, said resin having a softening point lower than the melting point of the wax.

These and other objects, features and advantages of the present invention are described in or will become apparent from the following detailed description of the invention.

DETAILED DESCRIPTION OF THE INVENTION

The hot-melt ink composition according to the first embodiment of the present invention will be first described below in detail.

The hot-melt ink composition according to the first embodiment of the present invention is solid at room temperature and is capable of forming a transparent image, comprises a wax having a melting point of about 50° C. or above, a resin and a colorant, and is characterized in that the resin has a softening point higher than the melting point of the wax.

Herein, the softening point of the resin refers to a value measured by the ring and ball method. In the case of crystalline resins, however, it may be a value measured by DSC (differential scanning calorimetry). The melting point of the wax refers to a value measured by DSC.

In the hot-melt ink composition according to the first embodiment of the present invention, the wax serves as the main component of the ink composition and determines ink properties such as thermal properties and viscosity. The resin has the function to provide the adhesive properties of ink to printing paper and control the viscosity of the ink composition. The colorant is a component that imparts color to the ink composition.

Since the resin has a softening point higher than the melting point of the wax, fine crystals of the resin prohibit the wax from crystallizing, so that an ink composition having a high transparency can be provided. Then, because of an increase in transparency of the ink composition itself, the print quality on OHP sheets can be improved. When images are actually printed using the present ink composition, good and sharp images can be formed on printing paper as a matter of course and also on OHP sheets, thus a high-performance transparent hot-melt ink composition usable in hot-melt ink-jet recording ink can be provided.

The wax used in the ink composition according to the first embodiment of the present invention may be any of those which are solid at room temperature and are capable of melting upon heating. Since the room temperature varies depending on service districts and service conditions, waxes which are solid at temperatures lower than 50° C. are preferred. With regard to the melting point, it may preferably be a temperature not higher than the temperature that readily enables heating in the ink-heating mechanism mounted on an ink-jet printer and yet does not affect the structural body of the printer. Among those usually commercially available, waxes having a melting point up to 150° C. are practical. Hence, the wax may preferably be those having a melting point of from 50° C. to 150° C., and also those stable to heat.

Such waxes may include conventional known waxes as exemplified by petroleum waxes, preferably paraffin wax or microcrystalline wax; vegetable waxes, preferably candelilla wax, carnauba wax, rice wax or jojoba solid wax; animal waxes, preferably beeswax, lanolin or spermaceti; mineral waxes, preferably montan wax; synthetic hydrocarbon waxes, preferably Fischer-Tropsh wax or polyethylene wax; hydrogenated waxes, preferably hardened castor oil or hardened castor oil derivatives; modified waxes, preferably montan wax derivatives, paraffin wax derivatives, microcrystalline wax derivatives or polyethylene wax derivatives; higher fatty acid waxes, preferably behenic acid, stearic acid, palmitic acid, myristic acid or lauric acid; higher alcohol waxes, preferably stearyl alcohol or behenyl alcohol; hydroxystearic acid waxes, preferably 12-hydroxystearic acid or 12-hydroxystearic acid derivatives; ketone waxes, preferably stearone or laurone; amine waxes, preferably dodecylamine, tetradecylamine or octadecylamine; ester waxes, preferably methyl stearate, octadecyl stearate, glycerol fatty ester, sorbitan fatty ester, propylene glycol fatty ester, ethylene glycol fatty ester or polyoxyethylene fatty ester; and polymer waxes, preferably α-olefin maleic anhydride copolymer wax; any of which may be used without any particular limitations. Any of these waxes may be used alone or in the form of a mixture of two or more.

The wax may preferably be contained in the ink composition in an amount ranging from 20% by weight to 80% by weight. More specifically, if the wax is in a content less than 20% by weight, properties of other additives may come out overall, and hence the ink composition may have a too high or unsettled melting point to tend to make the ink composition not sharply melt at ink-jetting temperature. Its content, however, is not limited to this lower limit when some other additive(s) is/are appropriately selected and properly used so that the melting point of these can be substantially equal to the melting point of the wax. If the wax is in a content more than 80% by weight, the ink composition may have an insufficient melt viscosity, so that it may adhere to printing paper with difficulty.

The resin used in the first embodiment of the present invention has the function to provide the adhesive properties of ink to printing paper and control the melt viscosity of the ink composition. The resin used has a softening point higher than the melting point of the wax, so that the resin can prohibit the wax from crystallizing and make transparent the ink composition. Preferably, the resin has a softening point higher by at least 5° C. than the melting point of the wax in order to ensure a time for the set of the resin. More preferably, the resin has a softening point higher by 5° C. to 20° C., much more preferably by 5° C. to 10° C. than the melting point of the wax, because, if the resin has a softening point too higher than the melting point of the wax and the resin sets at a temperature too higher than the melting point of the wax, the wax can not set at the temperature and therefore the ink composition as a whole requires a long time for the set thereof; in other words, because the setting of the whole ink composition is completed after the resin and the wax finish setting at the respective temperatures different from each other. In this instance, the resin preferably has a softening point of from 55° C. to 200° C., more preferably from 60° C. to 180° C., much more preferably from 60° C. to 140° C.

With regard to molecular weight, the resin may preferably have a weight average molecular weight (Mw) of from 500 to 500,000, more preferably from 600 to 400,000, and most preferably from 700 to 300,000, as values obtained from the results of molecular weight fractionation carried out by gel permeation chromatography or programmed-temperature gas chromatography, the former employing a differential refractometer as a detector and the latter employing a thermal conductometer as a detector.

As the resin, an oil-soluble resin is preferred. The oil-soluble resin may include, e.g., olefin resins, preferably polyethylene resin, polypropylene resin or polyisobutylene resin; vinyl resins, preferably ethylene-vinyl acetate copolymer resin, vinyl chloride-vinyl acetate copolymer resin, vinyl acetate resin or ethylene-vinyl chloride-vinyl acetate copolymer resin; acrylic resins, preferably methacrylate resin, polyacrylate resin, ethylene-ethyl acrylate copolymer resin or ethylene-ethyl methacrylate copolymer resin; and also phenol resins, polyurethane resins, polyamide resins, polyester resins, ketone resins, alkyd resins, rosin type resins, hydrogenated rosin resins, pertroleum resins, hydrogenated pertroleum resins, maleic acid resins, butyral resins, terpene resins, hydrogenated terpene resins, and coumarone-indene resins. Any of these resins may be used alone or in the form of a mixture of two or more.

The resin may preferably be contained in the ink composition in an amount ranging from 5% by weight to 60% by weight. More specifically, if the resin is in a content less than 5% by weight, the ink composition can not ensure a sufficient melt viscosity required as ink and also may have no transparency. If it is in a content more than 60% by weight, the ink composition may have a high melt viscosity to make it difficult to perform good ink ejection at operation temperature of ink-jet printer heads used in ink-jet recording.

As the colorant used in the hot-melt ink composition according to the first embodiment of the present invention, any dyes or pigments may be used so long as they are those conventionally used in oil-based ink compositions. As to the pigments, those commonly used in the technical field of printing may be used without regard to organic or inorganic. Stated specifically, the pigments may include conventionally known pigments as exemplified by carbon black, cadmium red, molybdenum red, chromium yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, perynone pigments, thioindigo pigments, quinopthalone pigments, and metal complex pigments, any of which may be used without any particular limitations. Any of these pigments may be used in combination.

As to the dyes used in the hot-melt ink composition according to the first embodiment of the present invention, any dyes may be used so long as they are dyes conventionally used in oil-based ink compositions, and may preferably include oil-soluble dyes such as azo dyes, disazo dyes, metal complex dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, and metal phthalocyanine dyes. Any of these dyes may be used in combination.

The colorant may preferably be contained in the ink composition in an amount of from 0.1% by weight to 10% by weight, more preferably from 0.5% by weight to 8% by weight also taking account of color forming performance of the printer, and still more preferably from 0.7% by weight to 5% by weight in order to ensure not to cause the deposition or aggregation from the ink composition that may be caused by thermal changes when the printer is operated.

As is clear from the foregoing description, the hot-melt ink composition according to the first embodiment of the present invention is solid at room temperature and is capable of forming transparent images, comprises the wax having a melting point of about 50° C. or above, the resin and the colorant, and is characterized in that the resin has a softening point higher than the melting point of the wax. Hence, fine crystals of the resin prohibit the wax from crystallizing, so that the ink composition can obtain a high transparency. Then, because of an increase in transparency of the ink composition itself, the print quality on OHP sheets can be improved. When images are actually printed using the present ink composition, good, sharp and transparent images can be formed on printing paper as a matter of course and also on OHP sheets. Also, the color of the ink composition adhering to the OHP sheet can be faithfully reproduced on the OHP projection screen.

The hot-melt ink composition according to the first embodiment is in general transparent itself as mentioned above. In addition, the hot-melt ink composition, when stored, may be opaque itself so far as it can form transparent images.

The hot-melt ink composition according to the second embodiment of the present invention will be described below in detail.

The hot-melt ink composition according to the second embodiment of the present invention is solid at room temperature and is capable of forming an opaque image, comprises a wax having a melting point of about 50° C. or above, a resin and a colorant, and is characterized in that the resin has a softening point lower than the melting point of the wax.

Herein, the softening point of the resin refers to a value measured by the ring and ball method. In the case of crystalline resins, however, it may be a value measured by DSC. The melting point of the wax refers to a value measured by DSC.

In the hot-melt ink composition according to the second embodiment of the present invention, the wax serves as the main component of the ink composition and determines ink properties such as thermal properties and viscosity. The resin has the function to provide the adhesive properties of ink to printing paper and control the viscosity of the ink composition. The colorant is a component that imparts color to the ink composition. Since the resin has a softening point lower than the melting point of the wax, fine crystals of the resin do not prohibit the wax from crystallizing, so that crystals of the wax more greatly grow and the ink composition can obtain a high opacity. Then, because of almost no transparency of the ink composition itself, the optical density on printing paper can be improved. When images are actually printed using this ink composition, sharp and opaque images having a good and sufficient density can be formed on printing paper as a matter of course and also on OHP sheets, thus shadowed areas (black areas) can be surely formed on the OHP projection screen.

In the hot-melt ink composition according to this second embodiment, a black dye may preferably be used as the colorant. When it is used, the images of the ink composition having adhered to printing paper or OHP sheets have a black color, so that shadowed areas (black areas) can be surely formed even on the OHP projection screen.

As the wax used in the hot-melt ink composition according to the second embodiment, the same waxes as exemplified in the hot-melt ink composition according to the first embodiment may be used. In particular, waxes having a melting point of from 50 to 150° C. are preferred. Any of these waxes may be used alone or in the form of a mixture of two or more.

The wax may also preferably be contained in the hot-melt ink composition in an amount of from 20 to 80% by weight for the same reasons as in the case of the hot-melt ink composition according to the first embodiment.

As the resin used in the hot-melt ink composition according to the second embodiment, the same resins as exemplified in the hot-melt ink composition according to the first embodiment may be used, provided that the resin used has a softening point lower than the melting point of the wax, so that the resin can not prohibit the wax from crystallizing and make opaque the ink composition. Preferably, the resin has a softening point lower by at least 5° C. than the melting point of the wax in order to ensure a time for the crystallization of the wax. More preferably, the resin has a softening point lower by 5° C. to 20° C., much more preferably by 5° C. to 10° C. than the melting point of the wax, because, if the resin has a softening point too lower than the melting point of the wax, the wax can not set and therefore the ink composition as a whole can not set nor be dried sufficiently at a room temperature. In this instance, the resin preferably has a softening point of from 45° C. to 180° C. in view of the fact that waxes commonly used for hot-melt ink compositions do not almost have a melting point of more than 180° C., more preferably from 50° C. to 160° C. in view of the drying of the ink compositions, much more preferably from 60° C. to 160° C. in view of the fact that waxes commonly used for hot-melt ink compositions have a melting point of 70° C. to 90° C., furthermore preferably from 60° C. to 125° C., much furthermore from 70° C. to 105° C. in view of inconveniences possessed by printers which can ensure that ink compositions are kept at high temperature, where the inconveniences include that such printers require not only special materials for their production but also special mechanical means for keeping such printers at such a high temperature and it therefore is very difficult to downsize such printers.

With respect to molecular weight, the resin used may preferably have a weight average molecular weight (Mw) of preferably from 500 to 500,000, more preferably from 600 to 400,000, and most preferably from 700 to 300,000, are preferred. Any of these resins may be used alone or in combination of two or more.

The resin may also preferably be contained in the hot-melt ink composition in an amount of from 5 to 60% by weight for the same reasons as in the case of the hot-melt ink composition according to the first embodiment.

As the colorant used in the hot-melt ink composition according to the second embodiment, any dyes or pigments may be used so long as they are those conventionally used in oil-based ink compositions. Accordingly, at least one of the inorganic pigments, organic pigments and dyes as exemplified in the hot-melt ink composition according to the first embodiment may be used.

In order to provide the hot-melt ink composition according to the second embodiment as a black ink composition, it is preferable incorporate a black dye in the colorant. Here, in the case of different colors for which the opacity of ink is strongly desired, dyes having the corresponding colors may be used.

As the black dye, any dyes may be used so long as they are black dyes conventionally used in oil-based ink compositions, and may preferably include oil-soluble black dyes such as azo dyes, disazo dyes, metal complex dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, and metal phthalocyanine dyes. Any of these black dyes may be used in combination.

Any of these colorants may preferably be contained in the ink composition in an amount of from 0.1% by weight to 10% by weight, more preferably from 0.5% by weight to 8% by weight taking account of color forming performance of the printer, and still more preferably from 0.7% by weight to 5% by weight in order to ensure not to cause the deposition of dye from the ink composition that may be caused by thermal changes when the printer is operated.

As is clear from the foregoing description, the hot-melt ink composition according to the second embodiment of the present invention is solid at room temperature and is capable of forming opaque images, comprises the wax having a melting point of about 50° C. or above, the resin and the colorant, and is characterized in that the resin has a softening point lower than the melting point of the wax. Hence, fine crystals of the resin do not prohibit the wax from crystallizing, so that crystals of the wax more greatly grow and the ink composition can obtain a high opacity. Then, because of almost no transparency of the ink composition itself, the optical density on printing paper can be improved. When images are actually printed using this ink composition, good, sharp and opaque images can be formed on printing paper as a matter of course and also on OHP sheets, thus shadowed areas (black areas) can be surely formed on the OHP projection screen.

The hot-melt ink composition according to the second embodiment is in general opaque itself as mentioned above. In addition, the hot-melt ink composition, when stored, may be transparent itself so far as it can form opaque images.

Especially when the black dye is incorporated in the colorant, the images of the ink composition having adhered to printing paper or OHP sheets have a black color, so that shadowed areas (black areas) can be surely formed even on the OHP projection screen.

The hot-melt ink compositions according to the first and second embodiments of the present invention as described above can be produced by mixing, e.g., with mechanical stirring, the above essential components and the optional components added as occasion calls, and filtering the resulting mixture with a membrane filter or the like to remove insoluble matter.

The hot-melt ink compositions of the present invention are useful as hot-melt inks used in ink-jet recording processes of various types in which the hot-melt ink composition is jetted to a recording medium in the form of droplets to make a record. It is especially suited for an ink-jet recording process in which the hot-melt ink composition is jetted in the form of droplets by utilizing the vibration of a piezoelectric device.

EXAMPLES

The present invention will be described below in greater detail by giving Examples. The present invention is by no means limited to these Examples.

Example 1

Room-temperature solid waxes used as vehicles in the present Example are N-oleylstearic acid amide (NIKKAMIDE OS, available from Nippon Kasei Chemical Co., Ltd.; melting point: 74° C.) and stearic acid amide wax (AMIDE AP-1, trade name; available from Nippon Kasei Chemical Co., Ltd.; melting point: 100° C.). As the resin, a polyamide resin (BIRTHAMIDE 756, trade name, available from Henkel Hakusui Corporation; softening point: 102–112° C.) is used, and as the dye, an oil-soluble dye C.I. Solvent Yellow 162 (NEOPEN YELLOW 075, trade name; available from BASF Corp.).

Ink formulation:

| NIKKAMIDE OS | 53% by weight |
|---|---|
| AMIDE AP-1 | 20% by weight |
| BIRTHAMIDE 756 | 25% by weight |
| NEOPEN YELLOW 075 | 2% by weight |

Figure 1:
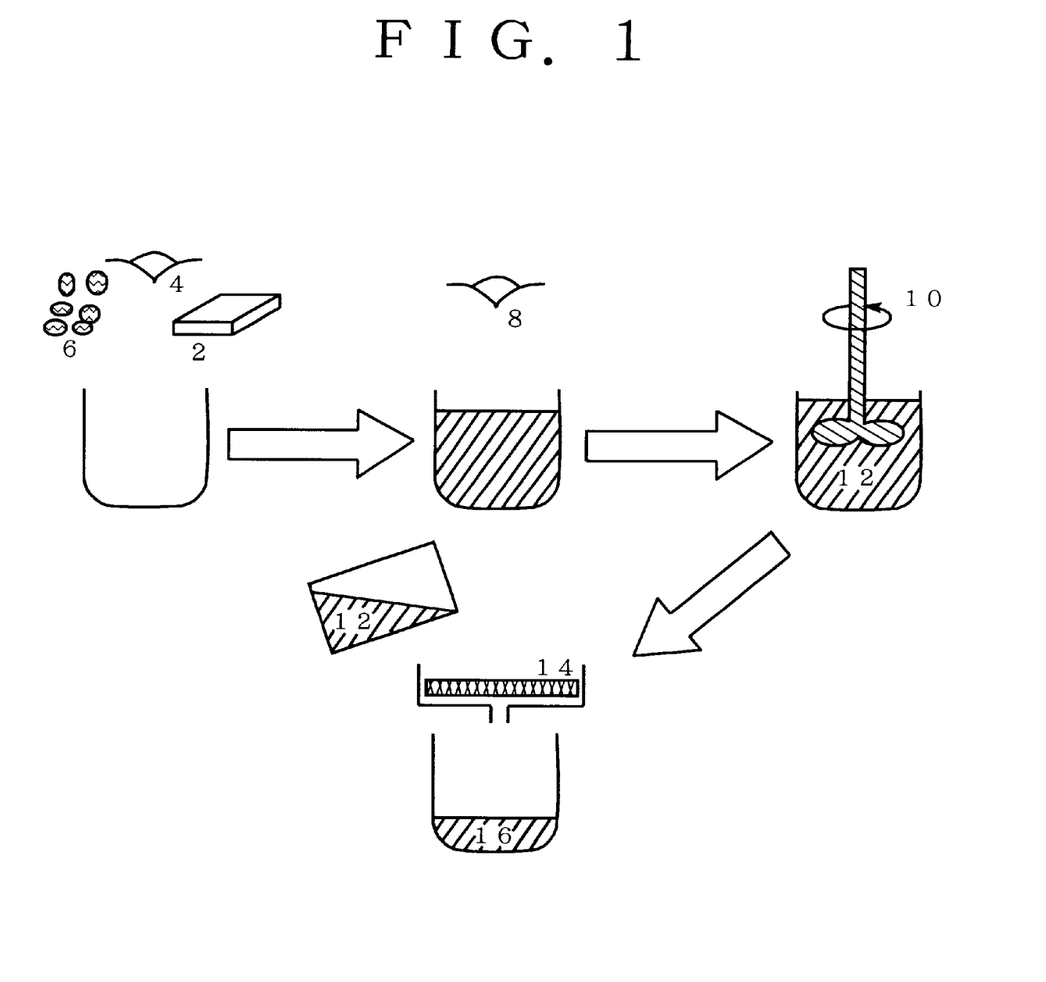
FIG. 1 illustrates a process for preparing the hot-melt ink composition of the present invention.

The above hot-melt ink composition can be produced by a procedure as shown in FIG. 1.

NIKKAMIDE (2), AMIDE AP-1 (4) and BIRTHAMIDE 756 (6) are heated and dissolved at a temperature of from 70° C. to 250° C., and preferably from 100° C. to 200° C., in approximation, and then NEOPEN YELLOW 075 (8) is mixed, which is mixed with stirring at from 200 to 10,000 r.p.m., and preferably from 500 to 5,000 r.p.m., by means of a dissolver (10). The ink composition (12) thus prepared is filtered with a 2 μm mesh filter (14) by means of a heat filtering apparatus manufactured by Toyo Roshi K. K., to obtain a final, hot-melt ink composition (16).

The hot-melt ink composition (16) thus prepared was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a clear color was obtained. Its transparency was measured using a hazometer (haze meter) (manufactured by Suga Shikenki K. K.) to find that it was 16.6%.

The above ink composition was set in an ink-jet printer to print images. As a result, sharp printed images were obtained on recording paper without causing any clogging of the printer head. It was also possible to print images well on OHP sheets, and the prints obtained well transmitted light.

Example 2

Room-temperature solid waxes used as vehicles in Example 2 are Fischer-Tropsh wax (FTP-1005, trade name; available from Nippon Seiro Co., Ltd.; melting point: 98° C.) and stearic acid amide wax (AMIDE AP-1, trade name; available from Nippon Kasei Chemical Co., Ltd.; melting point: 100° C.). As the resin, a hydrogenated petroleum resin (ALKON P-115, trade name; available from Arakawa Chemical Industries, Ltd.; softening point: 115° C.) is used, and as the dye, an oil-soluble dye C.I. Solvent Blue 70 (NEOPEN BLUE 808, trade name; available from BASF Corp.).

Ink formulation:

| FTP-1005 | 60% by weight |
|---|---|
| AMIDE AP-1 | 18% by weight |
| ALKON P-115 | 20% by weight |
| NEOPEN BLUE 808 | 2% by weight |

The above hot-melt ink composition can be produced by the same procedure as in Example 1.

The above FTP-1005, AMIDE AP-1 and ALKON P-115 are heated and dissolved at a temperature of from 70° C. to 250° C., and preferably from 100° C. to 200, in approximation, and then NEOPEN BLUE 808 is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K. K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a clear color was obtained. Its transparency was measured using a hazometer (manufactured by Suga Shikenki K. K.) to find that it was 20.2%.

The above ink composition was set in an ink-jet printer to print images. As a result, sharp printed images were obtained on recording paper without causing any clogging of the printer head.

COMPARATIVE EXAMPLE 1

Room-temperature solid waxes used as vehicles in COMPARATIVE EXAMPLE 1 are microcrystalline wax (HI-MIC 2095, trade name; available from Nippon Seiro Co., Ltd.; melting point: 101° C.) and stearic acid amide wax (AMIDE AP-1, trade name; available from Nippon Kasei Chemical Co., Ltd.; melting point: 100° C.). As the resin, a hydrogenated petroleum resin (ALKON P-90, trade name; available from Arakawa Chemical Industries, Ltd.; softening point: 90° C.) is used, and as the dye, an oil-soluble dye C.I. Solvent Yellow 162 (NEOPEN YELLOW 075, trade name; available from BASF Corp.).

The ink composition in COMPARATIVE EXAMPLE 1 has the following formulation.

Ink formulation:

| HI-MIC 2095 | 50% by weight |
|---|---|
| AMIDE AP-1 | 20% by weight |
| ALKON P-90 | 28% by weight |
| NEOPEN YELLOW 075 | 2% by weight |

The above hot-melt ink composition of Comparative Example 1 can be produced by a procedure as shown below.

HI-MIC 2095, AMIDE AP-1 and ALKON P-90 are heated and dissolved at a temperature of from 70° C. to 250° C., and preferably from 100° C. to 200° C., in approximation, and then NEOPEN YELLOW 075 is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K. K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, an ink film with an apparently lower transparency than that in Example 1 was obtained. Its transparency was measured using a hazometer (manufactured by Suga Shikenki K. K.) to find that it was a value of as much as 50.1%.

Two or three drops of the above composition were put and dissolved on a slide glass heated to 120° C. Then, a cover glass was put thereon and slightly held down, and the sample thus obtained was observed through transmitted light on a microscope (XF-UNR) manufactured by Nikon Co., to obtain the result that crystals of the wax were observed in a large number.

COMPARATIVE EXAMPLE 2

Room-temperature solid waxes used as vehicles in Comparative Example 2 are paraffin wax (paraffin wax standard product 155, available from Nippon Seiro Co., Ltd.; melting point: 69° C.) and methylenebisstearic acid amide (BISAMIDE, trade name; available from Nippon Kasei Chemical Co., Ltd.; melting point: 143° C.). As the resin, a polyamide resin (BIRTHAMIDE 756, trade name, available from Henkel Hakusui Corporation; softening point: 102–112° C.) is used, and as the dye, an oil-soluble dye C.I. Solvent Blue 70 (NEOPEN BLUE 808, trade name; available from BASF Corp.).

Ink formulation:

| Paraffin wax standard product 155 | 49% by weight |
|---|---|
| BISAMIDE | 25% by weight |
| BIRTHAMIDE 756 | 24% by weight |
| NEOPEN BLUE 808 | 2% by weight |

The above hot-melt ink composition can be produced by the same procedure as in Example 1.

The above paraffin wax standard product 155, BISAMIDE and BIRTHAMIDE 756 are heated and dissolved at a temperature of from 70° C. to 250° C., and preferably from 100° C. to 200° C., in approximation, and then NEOPEN BLUE 808 is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K. K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, an ink film with an apparently lower transparency than that in Example 1 was obtained. Its transparency was measured using a hazometer (manufactured by Suga Shikenki K. K.) to find that it was a value of as much as 42.6%.

Two or three drops of the above composition were put and dissolved on a slide glass heated to 120° C. Then, a cover glass was put thereon and slightly held down, and the sample thus obtained was observed through transmitted light on a microscope (XF-UNR) manufactured by Nikon Co., to obtain the result that crystals of the wax were observed in a large number.

Example 3

Room-temperature solid waxes used as vehicles in Example 3 are microcrystalline wax (HI-MIC 2095, trade name; available from Nippon Seiro Co., Ltd.; melting point: 101° C.) and stearic acid amide wax (AMIDE AP-1, trade name; available from Nippon Kasei Chemical Co., Ltd.; melting point: 100° C.). As the resin, a hydrogenated petroleum resin (ALKON P-70, trade name; available from Arakawa Chemical Industries, Ltd.; softening point: 70° C.) is used, and as the dye, an oil-soluble dye C.I. Solvent Black 3 (OIL BLACK HBB, trade name; available from Orient Chemical Industries Ltd.).

Ink formulation:

| HI-MIC 2095 | 53% by weight |
|---|---|
| AMIDE AP-1 | 20% by weight |
| ALKON P-70 | 25% by weight |
| OIL BLACK HBB | 2% by weight |

The above hot-melt ink composition can be produced by a procedure as shown in FIG. 1.

HI-MIC 2095 (2), AMIDE AP-1 (4) and ALKON P-70 (6) are heated and dissolved at a temperature of from 70° C. to 250° C., and preferably from 100° C. to 200° C., in approximation, and then OIL BLACK HBB (8) is mixed, which is mixed with stirring at from 200 to 10,000 r.p.m., and preferably from 500 to 5,000 r.p.m., by means of a dissolver (10). The ink composition (12) thus prepared is filtered with a 2 μm mesh filter (14) by means of a heat filtering apparatus manufactured by Toyo Roshi K. K., to obtain a final, hot-melt ink composition (16).

The hot-melt ink composition (16) thus prepared was melted on a hot plate heated to 110° C., and then coated on an OHP sheet (PP-2500, available from Sumitomo 3M Limited) using a wire-wound rod (winding wire diameter: 0.9 mm). As a result, a clear and opaque ink film was obtained. Its opacity was measured using a hazometer (manufactured by Suga Shikenki K. K.) to find that it was 50.6%.

The above ink composition was set in an ink-jet printer to print images. As a result, sharp printed images were obtained on recording paper without causing any clogging of the printer head. It was also possible to print images well on OHP sheets, and the prints obtained were sufficiently dense.

Example 4

Room-temperature solid waxes used as vehicles in Example 4 are Fischer-Tropsh wax (FTP-1005, trade name; available from Nippon Seiro Co., Ltd.; melting point: 98° C.) and stearic acid amide wax (AMIDE AP-1, trade name; available from Nippon Kasei Chemical Co., Ltd.; melting point: 100° C.). As the resin, a hydrogenated petroleum resin (ALKON P-90, trade name; available from Arakawa Chemical Industries, Ltd.; softening point: 90° C.) is used, and as the dye, an oil-soluble dye C.I. Solvent Black 29 (ORASOL BLACK RLI, trade name; available from Ciba-Geigy Corp.).

Ink formulation:

| FTP-1005 | 60% by weight |
|---|---|
| AMIDE AP-1 | 18% by weight |
| ALKON P-90 | 20% by weight |
| ORASOL BLACK RLI | 2% by weight |

The above hot-melt ink composition can be produced by the same procedure as in Example 3.

The above FTP-1005, AMIDE AP-1 and ALKON P-90 are heated and dissolved at a temperature of from 70° C. to 250° C., and preferably from 100° C. to 200° C., in approximation, and then ORASOL BLACK RLI is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K. K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, a clear and opaque ink film was obtained. Its opacity was measured using a hazometer (manufactured by Suga Shikenki K. K.) to find that it was 60.2%.

The above ink composition was set in an ink-jet printer to print images. As a result, sharp printed images were obtained on recording paper without causing any clogging of the printer head.

COMPARATIVE EXAMPLE 3

Room-temperature solid waxes used as vehicles in Comparative Example 3 are microcrystalline wax (HI-MIC 2095, trade name; available from Nippon Seiro Co., Ltd.; melting point: 101° C.) and stearic acid amide wax (AMIDE AP-1, trade name; available from Nippon Kasei Chemical Co., Ltd.; melting point: 100° C.). As the resin, a hydrogenated petroleum resin (ALKON P-115, trade name; available from Arakawa Chemical Industries, Ltd.; softening point: 115° C.) is used, and as the dye, an oil-soluble dye C.I. Solvent Black 29 (ORASOL BLACK RLI, trade name; available from Ciba-Geigy Corp.).

The ink composition in Comparative Example 3 has the following formulation.

Ink formulation:

| | |
|---|---|
| HI-MIC 2095 | 50% by weight |
| AMIDE AP-1 | 20% by weight |
| ALKON P-70 | 28% by weight |
| ORASOL BLACK RLI | 2% by weight |

The above hot-melt ink composition can be produced by a procedure as shown below.

HI-MIC 2095, AMIDE AP-1 and ALKON P-115 are heated and dissolved at a temperature of from 70° C. to 250° C., and preferably from 100° C. to 200° C., in approximation, and then ORASOL BLACK RLI is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K. K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, an ink film with an apparently higher transparency than that of Example 4 was obtained. Its transparency was measured using a hazometer (manufactured by Suga Shikenki K. K.) to find that it was 20.1%.

Two or three drops of the above composition were put and dissolved on a slide glass heated to 120° C. Then, a cover glass was put thereon and slightly held down, and the sample thus obtained was observed through transmitted light on a microscope (XF-UNR) manufactured by Nikon Co., to obtain the result that fine crystals of the wax were seen.

The above ink composition was set in an ink-jet printer to print images. As a result, sharp printed images were obtained on recording paper without causing any clogging of the printer head. However, when printed on OHP sheets, prints transmitted light undesirably to make it difficult for them to be used as samples for slides.

COMPARATIVE EXAMPLE 4

Room-temperature solid waxes used as vehicles in Comparative Example 4 are paraffin wax (paraffin wax standard product 155, available from Nippon Seiro Co., Ltd.; melting point: 69° C.) and methylenebisstearic acid amide (BISAMIDE, trade name; available from Nippon Kasei Chemical Co., Ltd.; melting point: 143° C.). As the resin, a polyamide resin (BIRTHAMIDE 756, trade name, available from Henkel Hakusui Corporation; softening point: 102–112° C.) is used, and as the dye, an oil-soluble dye C.I. Solvent Black 3 (OIL BLACK HBB, trade name; available from Orient Chemical Industries Ltd.).

Ink formulation:

| | |
|---|---|
| Paraffin wax standard product 155 | 49% by weight |
| BISAMIDE | 25% by weight |
| BIRTHAMIDE 756 | 24% by weight |
| OIL BLACK HBB | 2% by weight |

The above hot-melt ink composition can be produced by the same procedure as in Example 3.

The above paraffin wax standard product 155, BISAMIDE and BIRTHAMIDE 756 are heated and dissolved at a temperature of from 70° C. to 250° C., and preferably from 100° C. to 200° C., in approximation, and then OIL BLACK HBB is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K. K., to obtain a final, hot-melt ink composition.

The hot-melt ink composition thus prepared was melted on a hot plate heated to 110° C. and then coated on an OHP sheet (PP-2500, available from Sumitomo 3M Limited) using a wire-wound rod (winding wire diameter: 0.9 mm). As a result, an ink film with an apparently higher transparency than that of Example 3 was obtained. Its transparency was measured using a hazometer (manufactured by Suga Shikenki K. K.) to find that it was 12.6%.

Two or three drops of the above composition were put and dissolved on a slide glass heated to 120° C. Then, a cover glass was put thereon and slightly held down, and the sample thus obtained was observed through transmitted light on a microscope (XF-UNR) manufactured by Nikon Co., to obtain the result that fine crystals of the wax were seen.

The above ink composition was set in an ink-jet printer to print images. As a result, sharp printed images were obtained on recording paper without causing any clogging of the printer head. However, when printed on OHP sheets, prints transmitted light undesirably to make it difficult for them to be used as samples for slides.

The entire disclosures of Japanese Patent Applications No.8-153602 and No.8-153603 both filed on Jun. 14, 1996 including the specification, claims, figures and summaries are incorporated by reference in their entirety.

What is claimed is:

1. A method for controlling transparency of print so as to form a transparent image, comprising:

selecting a wax having a melting point of about 50° C. or above;

selecting a resin having a softening point higher than the melting point of said wax;

mixing the resin, the wax and a colorant to form a hot-melt ink composition; and applying the hot-melt ink composition to a recording medium to form a transparent image.

2. The method according to claim 1, wherein the softening point of the resin is higher by at least 5° C. than the melting point of the wax.

3. The method according to claim 1, wherein said wax has a melting point of from 50° C. to 150° C.

4. The method according to claim 1, wherein said wax is contained in said hot-melt ink composition in an amount of from 20% by weight to 80% by weight.

5. The method according to claim 1, wherein said wax is at least one wax selected from the group consisting of paraffin wax, microcrystalline wax, candelilla wax, carnauba wax, rice wax, jojoba solid wax, beeswax, lanolin, spermaceti, montan wax, Fischer-Tropsh wax, polyethylene wax, hardened castor oil, a modified hardened castor oil, a modified montan wax, a modified paraffin wax, a modified microcrystalline wax, a modified polyethylene wax, behenic acid, stearic acid, palmitic acid, myristic acid, lauric acid, stearyl alcohol, behenyl alcohol, 12-hydroxystearic acid, a modified 12-hydroxystearic acid, stearone, laurone, dodecylamine, tetradecylamine, octadecylamine, methyl stearate, octadecyl stearate, glycerol fatty ester, sorbitan fatty ester, propylene glycol fatty ester, ethylene glycol fatty ester, polyoxyethylene fatty ester and α-olefin maleic anhydride copolymer wax.

6. The method according to claim 1, wherein said resin has a softening point of from 55° C. to 200° C.

7. The method according to claim 1, wherein said resin has a weight average molecular weight of from 500 to 500,000.

8. The method according to claim 1, wherein said resin is contained in said hot-melt ink composition in an amount of from 5% by weight to 60% by weight.

9. The method according to claim 1, wherein in said resin selecting step at least one resin having a softening point higher than the melting point of the wax is selected from the group consisting of polyethylene resin, polypropylene resin, polyisobutylene resin, ethylene-vinyl acetate copolymer resin, vinyl chloride-vinyl acetate copolymer resin, vinyl acetate resin, ethylene-vinyl chloride-vinyl acetate copolymer resin, methacrylate resin, polyacrylate resin, ethylene-ethyl acrylate copolymer resin, ethylene-ethyl methacrylate copolymer resin, phenol resin, polyurethane resin, polyamide resin, polyester resin, ketone resin, alkyd resin, rosin resin, hydrogenated rosin resin, petroleum resin, hydrogenated petroleum resin, maleic acid resin, butyral resin, terpene resin, hydrogenated terpene resin, and coumarone-indene resin.

10. The method according to claim 1, wherein said colorant is contained in said hot-melt ink composition in an amount of from 0.1% by weight to 10% by weight.

11. The method according to claim 1, wherein said colorant is at least one oil-soluble dye selected from the group consisting of an azo dye, a disazo dye, a metal complex dye, a naphthol dye, an anthraquinone dye, an indigo dye, a carbonium dye, a quinoneimine dye, a cyanine dye, a quinoline dye, a nitro dye, a nitroso dye, a benzoquinone dye, a naphthoquinone dye, a xanthene dye, a phthalocyanine dye and a metal phthalocyanine dye.

12. A method for controlling transparency of print so as to form an opaque image, comprising:

selecting a wax having a melting point of about 50° C. of above;

selecting a resin having a softening point lower than the melting point of said wax;

mixing the resin, the wax and a colorant to form a hot-melt ink composition; and applying the hot-melt ink composition to a recording medium to form an opaque image.

13. The method according to claim 12, wherein the softening point of the resin is lower by at least 5° C. than the melting point of the wax.

14. The method according to claim 12, wherein said wax has a melting point of from 50° C. to 150° C.

15. The method according to claim 12, wherein said wax is contained in said hot-melt ink composition in an amount of from 20% by weight to 80% by weight.

16. The method according to claim 12, wherein said wax is at least one wax selected from the group consisting of paraffin wax, microcrystalline wax, candelilla wax, carnauba wax, rice wax, jojoba solid wax, beeswax, lanolin, spermaceti, montan wax, Fischer-Tropsh wax, polyethylene wax, hardened castor oil, a modified hardened castor oil, a modified montan wax, a modified paraffin wax, a modified microcrystalline wax, a modified polyethylene wax, behenic acid, stearic acid, palmitic myristic acid, lauric acid, stearyl alcohol, behenyl alcohol, 12-hydroxystearic acid, a modified 12-hydroxystearic acid, stearone, laurone, dodecylamine, tetradecylamine, octadecylamine, methyl stearate, octadecyl stearate, glycerol fatty ester, sorbitan fatty ester, propylene glycol fatty ester, ethylene glycol fatty ester, polyoxyethylene fatty ester and α-olefin maleic anhydride copolymer wax.

17. The method according to claim 12, wherein said resin has a softening point of from 45° C. to 180° C.

18. The method according to claim 12, wherein said resin has a weight average molecular weight of from 500 to 500,000.

19. The method according to claim 12, wherein said resin is contained in said hot-melt ink composition in an amount of from 5% by weight to 60% by weight.

20. The method according to claim 12, wherein in said resin selecting step at least one resin having a softening point lower than the melting point of the wax is selected from the group consisting of polyethylene resin, polypropylene resin, polyisobutylene resin, ethylene-vinyl acetate copolymer resin, vinyl chloride-vinyl acetate copolymer resin, vinyl acetate resin, ethylene-vinyl chloride-vinyl acetate copolymer resin, methacrylate resin, polyacrylate resin, ethylene-ethyl acrylate copolymer resin, ethylene-ethyl methacrylate copolymer resin, phenol resin, polyurethane resin, polyamide resin, polyester resin, ketone resin, alkyd resin, rosin resin, hydrogenated rosin resin, petroleum resin, hydrogenated petroleum resin, maleic acid resin, butyral resin, terpene resin, hydrogenated terpene resin, and coumarone-indene resin.

21. The method according to claim 12, wherein said colorant comprises a black dye.

22. The method according to claim 21, wherein said black dye is at least one oil-soluble black dye selected from the group consisting of an azo dye, a disazo dye, a metal complex dye, a naphthol dye, an anthraquinone dye, an indigo dye, a carbonium dye, a quinoneimine dye, a cyanine dye, a quinoline dye, a nitro dye, a nitroso dye, a benzoquinone dye, a naphthoquinone dye, a xanthene dye, a phthalocyanine dye and a metal phthalocyanine dye.

23. The method according to claim 12, wherein said colorant is contained in said hot-melt ink composition in an amount of from 0.1% by weight to 10% by weight.

24. An ink-jet recording process comprising jetting a hot-melt ink composition to a recording medium in the form of droplets to make a record; said hot-melt ink composition, which is solid at room temperature and is capable of forming a transparent image, comprising a wax having a melting point of about 50° C. or above, a resin and a colorant, said resin having a softening point higher than the melting point of said wax.

25. The ink-jet recording process according to claim 24, wherein said hot-melt ink composition is jetted in the form of droplets by utilizing the vibration of a piezoelectric device.

26. An ink-jet recording process comprising jetting a hot-melt ink composition to a recording medium in the form of droplets to make a record; said hot-melt ink composition, which is solid at room temperature and is capable of forming an opaque image, comprising a wax having a melting point of about 50° C. or above, a resin and a colorant, said resin having a softening point lower than the melting point of said wax.

27. The method according to claim 5, wherein said wax is at least one wax selected from the group consisting of paraffin wax, microcrystalline wax, candelilla wax, carnauba wax, rice wax, jojoba solid wax, beeswax, lanolin, spermaceti, montan wax, Fischer-Tropsh wax, polyethylene wax, hardened castor oil, behenic acid, stearic acid, palmitic acid, myristic acid, lauric acid, stearyl alcohol, behenyl alcohol, 12-hydroxystearic acid, stearone, laurone, dodecylamine, tetradecylamine, octadecylamine, methyl stearate, octadecyl stearate, glycerol fatty ester, sorbitan fatty ester, propylene glycol fatty ester, ethylene glycol fatty ester, polyoxyethylene fatty ester and α-olefin maleic anhydride copolymer wax.

28. The method according to claim 16, wherein said wax is at least one wax selected from the group consisting of paraffin wax, microcrystalline wax, candelilla wax, carnauba wax, rice wax, jojoba solid wax, beeswax, lanolin, spermaceti, montan wax, Fischer-Tropsh wax, polyethylene wax, hardened castor oil, behenic acid, stearic acid, palmitic acid, myristic acid, lauric acid, stearyl alcohol, behenyl alcohol, 12-hydroxystearic acid, stearone, laurone, dodecylamine, tetradecylamine, octadecylamine, methyl stearate, octadecyl stearate, glycerol fatty ester, sorbitan fatty ester, propylene glycol fatty ester, ethylene glycol fatty ester, polyoxyethylene fatty ester and α-olefin maleic anhydride copolymer wax.

29. The method according to claim 1, wherein in the mixing step the resin and wax are mixed, heated and dissolved at a temperature of from 70° C. to 250° C. and then mixed with the colorant with stirring at from 200 to 10,000 r.p.m.

30. The method according to claim 1, wherein the applying step comprises jetting the hot-melt ink composition to the recording medium in the form of droplets to make a record.

31. The method according to claim 30, wherein said hot-melt ink composition is jetted in the form of droplets utilizing the vibration of a piezoelectric device.

32. The method according to claim 12, wherein in the mixing step the resin and wax are mixed, heated and dissolved at a temperature of from 70° C. to 250° C. and then mixed with the colorant with stirring at from 200 to 10,000 r.p.m.

33. The method according to claim 12, wherein the applying step comprises jetting the hot-melt ink composition to the recording medium in the form of droplets to make a record.

34. The method according to claim 33, wherein said hot-melt ink composition is jetted in the form of droplets utilizing the vibration of a piezoelectric device.

* * * * *